(12) United States Patent
Muto et al.

(10) Patent No.: US 11,550,894 B2
(45) Date of Patent: Jan. 10, 2023

(54) CONFIRMATION SYSTEM AND CONFIRMATION METHOD

(71) Applicant: NIPPON TELEGRAPH AND TELEPHONE CORPORATION, Tokyo (JP)

(72) Inventors: Kenichiro Muto, Musashino (JP); Takeshi Nagayoshi, Musashino (JP); Kimihiro Yamakoshi, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 96 days.

(21) Appl. No.: 16/973,434

(22) PCT Filed: Jun. 17, 2019

(86) PCT No.: PCT/JP2019/023971
§ 371 (c)(1),
(2) Date: Dec. 9, 2020

(87) PCT Pub. No.: WO2019/244855
PCT Pub. Date: Dec. 26, 2019

(65) Prior Publication Data
US 2021/0248224 A1 Aug. 12, 2021

(30) Foreign Application Priority Data

Jun. 18, 2018 (JP) .............................. JP2018-115575

(51) Int. Cl.
*G06F 21/44* (2013.01)
*G06F 21/53* (2013.01)
(Continued)

(52) U.S. Cl.
CPC .............. *G06F 21/44* (2013.01); *G06F 21/53* (2013.01); *G06F 21/602* (2013.01); *G06F 21/64* (2013.01); *G06F 2221/2149* (2013.01)

(58) Field of Classification Search
CPC ........ G06F 21/44; G06F 21/53; G06F 21/602; G06F 21/64; G06F 2221/2149; G06F 21/74; G09C 1/00; H04L 9/10; H04L 9/32
See application file for complete search history.

(56) References Cited

U.S. PATENT DOCUMENTS 8,572,368 B1 * 10/2013 Deacon ................... G06F 21/64
713/158
10,386,358 B2 * 8/2019 Arias ..................... B60K 28/00
(Continued)

OTHER PUBLICATIONS

BaoFeng BF-888S User Manual, Sep. 2020 (Year: 2020).*
(Continued)

*Primary Examiner* — Shin-Hon (Eric) Chen
*Assistant Examiner* — Ethan V Vo
(74) *Attorney, Agent, or Firm* — Xsensus LLP

(57) ABSTRACT

A trusted application (TA) operates on a trusted execution environment (TEE) and generates a screen. Further, the TA transmits certification information for certifying validity of the TA to a verification device. The verification device verifies whether the TA is valid on the basis of the certification information. Further, the verification device authenticates a display device when the validity of the TA is certified and when the verification device is capable of confirming the facts that a picture is being output and that a device outputting the picture is the display device. Further, the verification device outputs a random number code when the display device is authenticated. Further, the verification device transmits the random number code to the display device when the display device is authenticated. Further, the (Continued)

display device receives the random number code from the verification device and displays the same.

8 Claims, 9 Drawing Sheets

(51) Int. Cl.
    *G06F 21/60*     (2013.01)
    *G06F 21/64*     (2013.01)

(56) References Cited

U.S. PATENT DOCUMENTS

| | | | | |
|---|---|---|---|---|
| 11,100,227 | B2* | 8/2021 | Li | H04M 1/72448 |
| 2007/0192841 | A1* | 8/2007 | Kim | H04L 9/3273 |
| | | | | 726/5 |
| 2013/0263215 | A1* | 10/2013 | Ekdahl | G06F 21/84 |
| | | | | 726/2 |
| 2016/0021093 | A1* | 1/2016 | Vinckier | H04L 67/10 |
| | | | | 726/9 |
| 2016/0381003 | A1* | 12/2016 | Caceres | H04L 63/0861 |
| | | | | 713/156 |
| 2018/0035293 | A1* | 2/2018 | Elnekaveh | H04L 67/01 |
| 2018/0096137 | A1* | 4/2018 | Trostle | G06F 21/53 |

OTHER PUBLICATIONS

Global Platform, "TEE System Architecture", GlobalPlatform Device Technology, Version 1.1, Jan. 2017, pp. 1-43.
Global Platform, "Trusted User Interface API", GlobalPlatform Device Technology, Version 1.0, Jun. 2013, pp. 1-48.
Global Platform, "TEE Management Framework", GlobalPlatform Device Technology, Version 1.0, Nov. 2016, pp. 1-228.

* cited by examiner

CONFIRMATION SYSTEM AND CONFIRMATION METHOD

CROSS-REFERENCE TO RELATED APPLICATIONS

The present application is based on PCT filing PCT/JP2019/023971, filed Jun. 17, 2019, which claims priority to JP 2018-115575, filed Jun. 18, 2018, the entire contents of each are incorporated herein by reference.

TECHNICAL FIELD

The present invention relates to a confirmation system and a confirmation method.

BACKGROUND ART

Conventionally, in a mobile device or an embedded device (hereinafter referred to as a device), there has been known a technology to divide an execution environment for an application operating on an OS (Operating System) inside the device into a normal execution environment (REE: Rich Execution Environment) and an execution environment (TEE: Trusted Execution Environment) in which an application can be be safely executed (see, for example, NPL 1).

Further, there has been known a technology (TUI: Trusted User Interface) to cause a TEE mounted in a device to occupy an input/output screen and perform an information input operation or information output processing between a TA (Trusted Application) operating inside the TEE and a device user without the interposition of a REE (see, for example, NPL 2).

Here, in the execution of the TUI, there is sometimes a problem that a malicious application operating inside the REE disguises itself as the TA and outputs a false input/output screen. In order to address this, there has been proposed a method for confirming a state in which an input/output screen can be occupied by a TEE.

For example, there has been proposed a method for embedding a LED lamp for indicating screen output from a TEE in a device, causing the TEE to occupy the LED lamp, and informing the occupation of an input/output screen through lighting up the lamp. Further, for example, there has been proposed a method for storing secret information in a data storage region that is accessible from a TEE but not accessible from a REE and displaying the secret information in an input/output screen.

CITATION LIST

Non Patent Literature

[NPL 1] Global Platform, "TEE System Architecture Version 1.1," January 2017
[NPL 2] Global Platform, "Trusted User Interface API Version 1.0," June 2013
[NPL 3] Global Platform, "TEE Management Framework Version 1.0," November 2016

SUMMARY OF THE INVENTION

Technical Problem

However, according to the conventional methods, there is a problem that it is sometimes difficult to easily and reliably confirm a state in which an input/output screen can be occupied by a TEE. For example, as for a method for lighting up a LED lamp, it is sometimes difficult to embed a LED that is occupiable by a TEE lamp later in a device in which the LED lamp had not been embedded at its manufacturing stage. Further, as for a method for storing secret information, a malicious person possibly steals a glance at or estimates the secret information. Therefore, there is a case that safety is not reliably ensured.

Means for Solving the Problem

In order to solve the above problems and achieve an object, a confirmation system includes: a display device that includes a first execution environment and a second execution environment that is guaranteed to be higher in safety than the first execution environment; and a verification device that verifies whether the display device works normally, wherein the display device has a generation unit that operates on the second execution environment and generates first information, a first transmission unit that transmits certification information for certifying validity of the generation unit to the verification device, a reception unit that receives third information from the verification device, and a first output unit that outputs the first information generated by the generation unit and also outputs the third information received by the reception unit, and the verification device has a verification unit that verifies whether the generation unit is valid on the basis of the certification information, an authentication unit that authenticates the display device when the validity of the generation unit is certified by the verification unit and when the verification unit is capable of confirming facts that the first information is being output and that a device outputting the first information is the display device, a second output unit that outputs second information when the display device is authenticated by the verification unit, and a second transmission unit that transmits the third information to the display device when the display device is authenticated by the verification unit.

Effects of the Invention

According to the present invention, it is possible to easily and reliably confirm a state in which an input/output screen can be occupied by a TEE.

DESCRIPTION OF EMBODIMENTS

Figure 1:
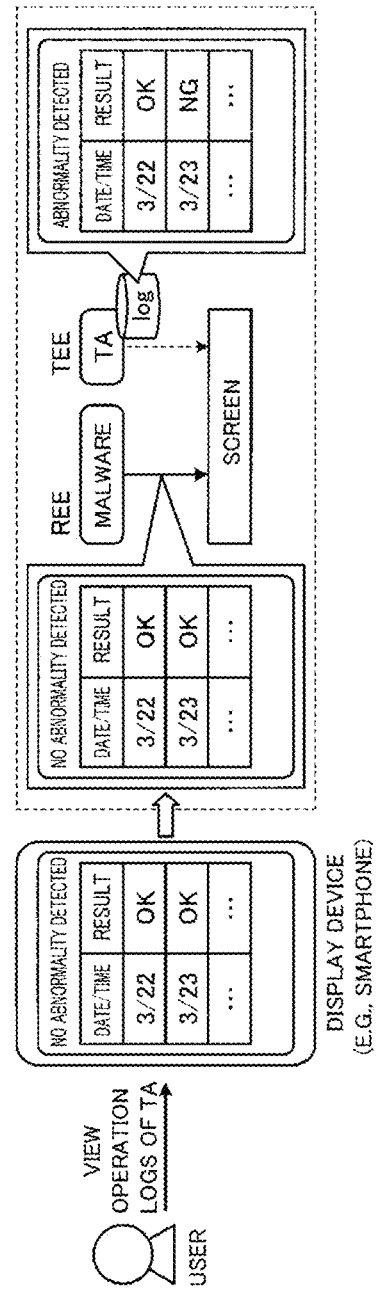
FIG. 1 is a diagram for describing the disguise of a screen.

Hereinafter, embodiments of a confirmation system and a confirmation method according to the present application will be described in detail on the basis of the drawings. Note that the present invention is not limited to the following embodiments. Further, the confirmation system of the embodiments is aimed at confirming whether a screen that is supposed to be occupied by a TEE is disguised through a REE. Then, the disguise of a screen will be first described using FIG. 1. FIG. 1 is a diagram for describing the disguise of a screen.

As shown in FIG. 1, there is, for example, a case that a user cannot distinguish whether a screen displayed on a display device such as a smartphone has been output from a TA operating on a TEE or has been output by malware operating on a REE. In the example of FIG. 1, a picture indicating that abnormality has been found is supposed to be output to the display device by a TA, but a picture indicating that no abnormality has been found is output to the display device by malware. In this case, the user overlooks the occurrence of the abnormality.

Figure 2:
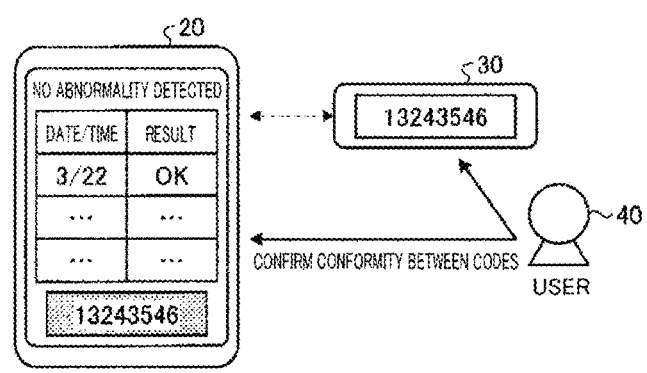
FIG. 2 is a diagram for describing the outline of a confirmation system according to a first embodiment.

Therefore, in the embodiments, a prescribed code or the like is displayed on a verification device 30 different from a display device 20 so that a user 40 can confirm the nonoccurrence of disguise as shown in FIG. 2. FIG. 2 is a diagram for describing the outline of a confirmation system according to a first embodiment. For example, the user 40 confirms whether the display device 20 works normally by confirming the conformity between a code displayed on the display device 20 and a code displayed on the verification device 30.

[Configuration of First Embodiment]

Figure 3:
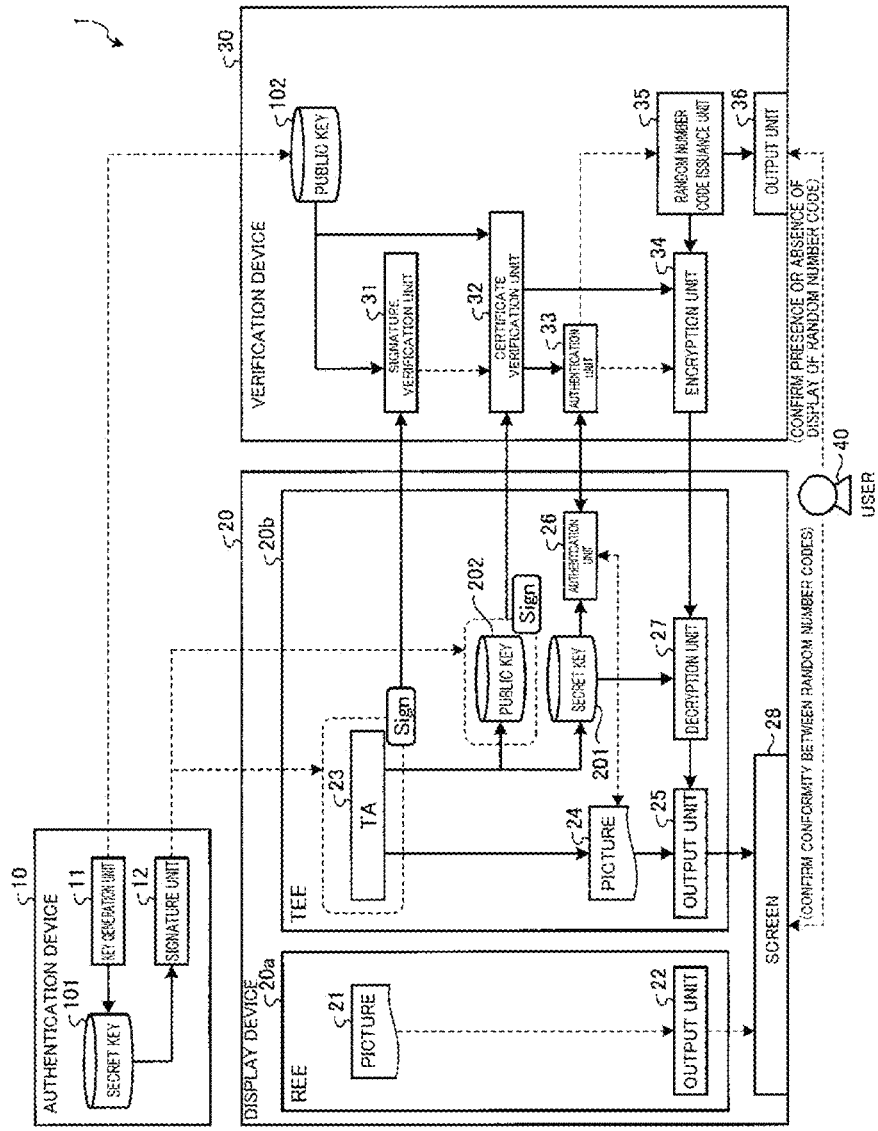
FIG. 3 is a diagram showing an example of the configuration of the confirmation system according to the first embodiment.

The configuration of the confirmation system according to the first embodiment will be described using FIG. 3. FIG. 3 is a diagram showing an example of the configuration of the confirmation system according to the first embodiment. As shown in FIG. 3, a confirmation system 1 has an authentication device 10, a display device 20, and a verification device 30.

The authentication device 10 is a device that realizes a function such as the issuance of a certificate at a certificate authority. The authentication device 10 has a key generation unit 11 and a signature unit 12. The key generation unit 11 generates a pair of a public key and a secret key to create a code signing certificate or a public key certificate. The public key generated by the key generation unit 11 functions as a route public key. The key generation unit 11 generates a secret key 101 and a public key 102 as a pair, stores the secret key 101, and distributes the public key 102 to the verification device 30.

The signature unit 12 creates a signature using the secret key 101 generated by the key generation unit 11. Further, the signature unit 12 assigns a code signing certificate issued using a created signature to a TA 23 that will be described later. In this manner, the confirmation system 1 can certify the fact that the TA 23 is installed in the display device 20.

Further, the signature unit 12 issues a public key certificate corresponding to a public key acquired from the display device 20 after confirming the fact that the TA 23 is installed in the display device 20 with a code signing certificate.

In this manner, the authentication device 10 manages the installation of the TA 23 in the display device 20. Note that the authentication device 10 may use a method described in NPL 3 as a method for managing the installation of the TA 23.

The display device 20 includes a REE 20a and a TEE 20b that is guaranteed to be higher in safety than the REE 20a. The display device 20 has an output unit 22, the TA 23, an output unit 25, an authentication unit 26, a decryption unit 27, and a screen 28. The output unit 22 operates on the REE 20a and outputs a picture 21 generated on the REE 20a to the screen 28. Further, the output unit 25 operates on the TEE 20b and outputs a picture 24 generated by the TA 23 to the screen 28.

The TA 23 is an application that is installed in the TEE 20b. The TA 23 is assigned a code signing certificate from the authentication device 10 at its installation. The TA 23 is an example of a generation unit and a first transmission unit.

The TA 23 operates on the TEE 20b and generates the picture 24. The picture 24 is an example of first information. For example, the picture 24 is a picture that indicates a list of logs and the presence or absence of abnormality as shown in FIG. 1. Further, the output unit 25 outputs the picture 24 generated by the TA 23 to the screen 28.

Further, the TA 23 generates a pair of the secret key 201 and the public key 202. Here, the TA 23 transmits a code signing certificate that is information issued by the authentication device 10 and certifies the validity of the TA 23 as an application to the verification device 30. In addition, the TA 23 transmits a public key certificate for the public key 202 issued by the authentication device 10 to the verification device 30. Note that the code signing certificate and the public key certificate are an example of certification information.

The authentication unit 26 receives an authentication request from the verification device 30 and returns an authentication response calculated on the basis of the secret key 201 and the authentication request to the verification device 30 only when the picture 24 is being output. A method for calculating an authentication response by the authentication unit 26 is only required to be a system corresponding to an authentication request from the opposite authentication unit 33. For example, the authentication unit 26 can calculate an authentication response using a method such as an electronic signature and a challenge response system.

The decryption unit 27 receives a random number code encrypted by an encryption unit 34 of the verification device 30 that will be described later and decrypts the received random number code with the secret key 201. Further, the decryption unit 27 transfers the decrypted random number code to the output unit 25. Note that the decryption unit 27 is an example of a reception unit.

Then, the output unit 25 outputs a random number code decrypted by the decryption unit 27. Note that the random number code is an example of second information and third information. Further, the second information and the third information may be the same as in the present embodiment, or may be different from each other. Further, the output unit 25 is an example of a first output unit.

The verification device 30 has a signature verification unit 31, a certificate verification unit 32, the authentication unit 33, the encryption unit 34, a random number code issuance unit 35, and an output unit 36. The signature verification unit 31 verifies the validity of a code signing certificate on the basis of information acquired from the authentication device 10. Further, the certificate verification unit 32 verifies the validity of a public key certificate on the basis of information acquired from the authentication device 10. In this manner, the signature verification unit 31 and the certificate verification unit 32 verify whether the TA 23 is valid on the basis of certification information. Note that the signature verification unit 31 and the certificate verification unit 32 are an example of a verification unit.

Note that the verification of validity in the present embodiment indicates the execution of a confirmation procedure by an issuance source in a general signature algorithm using a hash or the like. For example, when a value obtained by decrypting the signature of a code signing certificate with the public key 102 and a hash value of the code of the TA 23 match each other, the verification device 30 regards the code signing certificate as being valid. Further, when a value obtained by decrypting the signature of a public key with the public key 102 indicates a certificate authority having the authentication device 10, the verification device 30 regards the public key certificate as being valid.

The authentication unit 33 authenticates the display device 20 when the validity of the TA 23 is certified by the signature verification unit 31 and the certificate verification unit 32 and when the signature verification unit 31 and the certificate verification unit 32 are capable of confirming the facts that first information is being output and that a device outputting the first information is the display device 20. In the present embodiment, the authentication unit 33 authenticates the display device 20 when the validity of a code signing certificate is certified by the signature verification unit 31, the validity of a public key certificate is certified by the certificate verification unit 32, and a valid authentication response is returned by the authentication unit 26 of the display device 20.

The random number code issuance unit 35 issues a random number code when the display device 20 is authenticated by the authentication unit 33. The encryption unit 34 encrypts the random number code with the public key 202 and transmits the encrypted random number code to the display device 20. Note that the encryption unit 34 is an example of a second transmission unit.

Further, the output unit 36 outputs a random number code when the display device 20 is authenticated by the authentication unit 33. Note that the output unit 36 is an example of a second output unit.

As described above, the output unit 25 and the output unit 36 output an identical random number code when the validity of a code signing certificate and a public key certificate is certified by the verification device 30. Therefore, the user 40 can confirm whether the TA 23 of the display device 20 works normally by confirming random number codes displayed on the display device 20 and the verification device 30.

The verification device 30 certifies the fact that the TA 23 is installed in the display device 20 by verifying the validity of a public key certificate. Further, the verification device 30 certifies a state in which the TA 23 is displaying the picture 24 that is reliable on the display device 20 by verifying the validity of a code signing certificate.

For example, when a random number code is not displayed on the verification device 30, it is presumed that the screen of the display device 20 that is being viewed by the user 40 is a disguised screen output from the REE 20*a*. Further, when a random number code displayed on the display device 20 and a random number code displayed on the verification device 30 do not match each other, it is presumed that the screen of the display device 20 that is being viewed by the user 40 is a disguised screen output from the REE 20*a* or the display device 20 has been replaced.

[Processing of First Embodiment]

Figure 4:
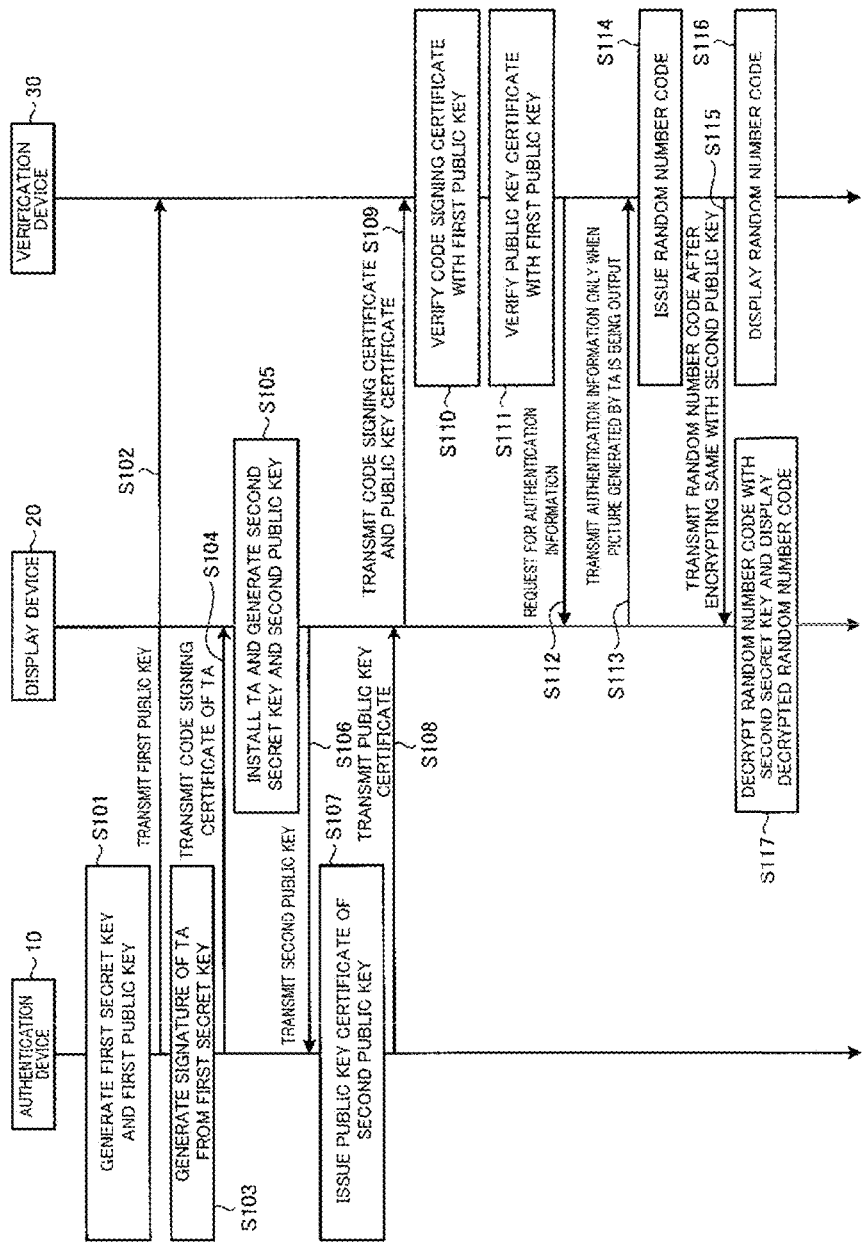
FIG. 4 is a sequence diagram showing the flow of the processing of the confirmation system according to the first embodiment.

The flow of the processing of the confirmation system 1 will be described using FIG. 4. FIG. 4 is a sequence diagram showing the flow of the processing of the confirmation system according to the first embodiment. As shown in FIG. 4, the authentication device 10 first generates a first secret key and a first public key (step S101).

Then, the authentication device 10 transmits the first public key to the verification device 30 (step S102). Further, the authentication device 10 generates the signature of a TA from the first public key (step S103). Then, the authentication device 10 transmits a code signing certificate generated from the signature to the display device 20 (step S104).

The display device 20 installs the TA and generates a second secret key and a second public key (step S105). Then, the display device 20 transmits the second public key to the authentication device 10 and requests for the issuance of a public key certificate (step S106). Here, the authentication device 10 issues the public key certificate (step S107) and transmits the same to the display device 20 (step S108). Then, the display device 20 transmits the code signing certificate and the public key certificate to the verification device 30 (step S109).

The verification device 30 verifies the validity of the code signing certificate with the first public key (step S110). Further, the verification device 30 verifies the validity of the public key certificate with the first public key (step S111). Then, the verification device 30 requests the display device 20 to transmit authentication information when the validity is certified in each of the verification (step S112). The display device 20 transmits the authentication information in response to the authentication request only when a picture generated by the TA is being output (step S113).

Then, the verification device 30 issues a random number code (step S114) and transmits the issued random number code to the display device 20 after encrypting the same with the second public key (step S115). Here, the verification device 30 displays the random number code (step S116). Further, the display device 20 decrypts the random number code transmitted from the verification device 30 with the second secret key and displays the decrypted random number code (step S117).

[Effects of First Embodiment]

The TA 23 of the display device 20 operates on the TEE 20*b* and generates first information. Further, the TA 23 transmits certification information for certifying the validity of the TA 23 to the verification device 30. Further, the display device 20 receives third information from the verification device 30. Further, the display device 20 outputs the first information generated by the TA 23 and also outputs the received third information. The verification device 30 verifies whether the TA 23 is valid on the basis of the certification information. Further, the verification device 30 authenticates the display device 20 when the validity of the TA 23 is certified and when the verification device 30 is capable of confirming the facts that the first information is being output and that a device outputting the first information is the display device 20. Further, the verification device 30 outputs second information when the display device 20 is authenticated. Further, the verification device 30 transmits the third information to the display device 20 when the display device 20 is authenticated.

In this manner, it is possible to confirm the fact that an input/output screen can be occupied by a TEE without the provision of hardware such as an LED dedicated to the TEE in the display device 20 according to the first embodiment. Further, the verification device 30 generates and outputs a code every time the verification device 30 certifies the facts that a TA has been installed in the display device 20 and certifies a state in which the TA is displaying a reliable picture on the display device 20. Therefore, it is possible to confirm the fact that the input/output screen can be occupied by the TEE without being influenced by stealthy glancing or estimation of a code. Therefore, it is possible to easily and reliably confirm the fact that an input/output screen can be occupied by a TEE according to the confirmation system 1 of the first embodiment.

Further, the TA 23 can also generate a pair of the secret key 201 and the public key 202. Further, the TA 23 can transmit the code signing certificate of the TA 23 and the public key certificate of the public key 202 to the verification device 30 as certification information. At this time, the verification device 30 verifies whether the code signing certificate and the public key certificate are valid. Further, the verification device 30 transmits third information after encrypting the same with the public key 202. Then, the display device 20 decrypts the encrypted third information. In this manner, the confirmation system 1 of the first embodiment can perform verification using a code signing certificate or a public key certificate as the function of an existing certificate authority. Therefore, the confirmation system 1 is not required to add a new certificate authority.

Further, the verification device 30 can issue a random number code. At this time, the verification device 30 outputs the random number code as second information. Further, the verification device 30 transmits a random number code as third information. In this manner, it is possible to issue a random number code as required and confirm the same in the first embodiment. Therefore, it is possible to prevent a code for confirmation from being leaked out in advance in the first embodiment.

Second Embodiment

A second embodiment will be described. Note that points common to the first embodiment will be appropriately omitted in the description of the second embodiment. A random number code is issued after verification is performed by the verification device 30 in the first embodiment, whereas a random number code is set in advance before verification is performed in the second embodiment.

Figure 5:
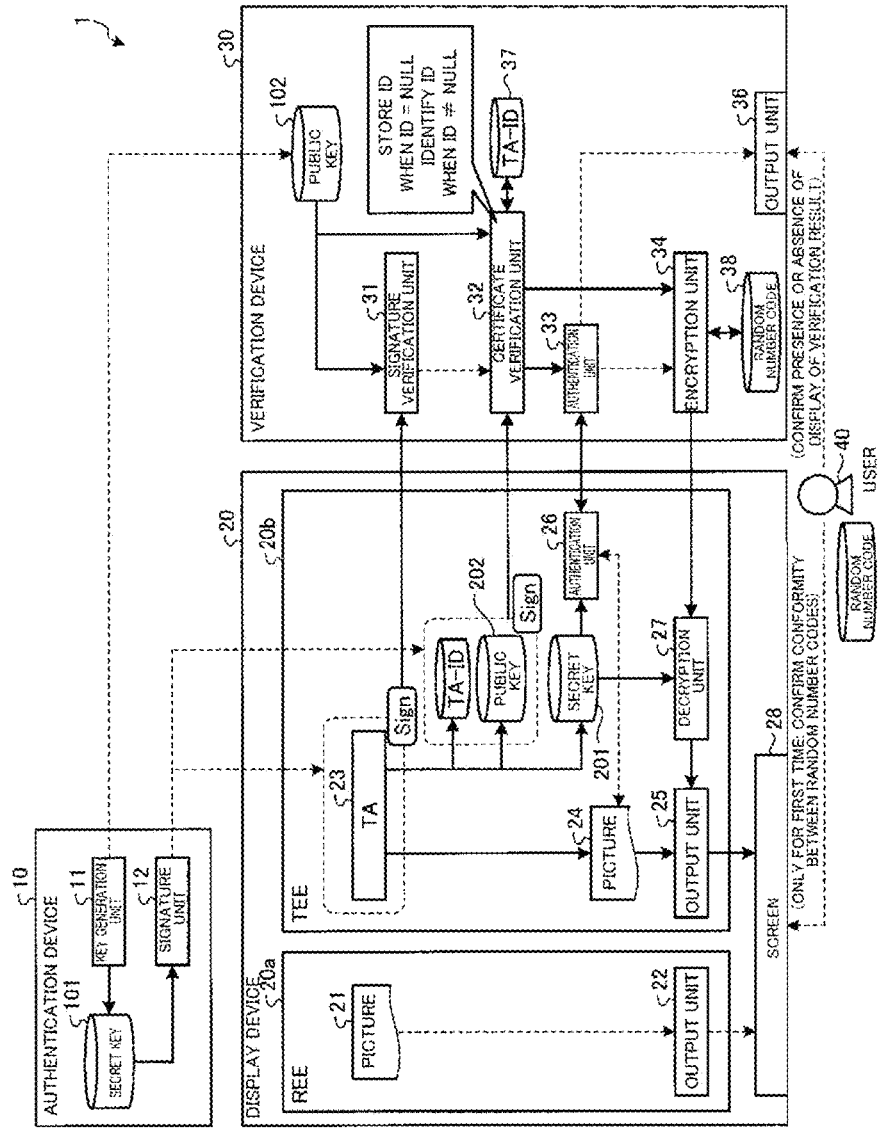
FIG. 5 is a diagram showing an example of the configuration of a confirmation system according to a second embodiment.

FIG. 5 is a diagram showing an example of the configuration of a confirmation system according to the second embodiment. In the second embodiment, a TA 23 generates a TA-ID that is identification information for identifying the TA 23 as shown in FIG. 5. Further, a verification device 30 stores a TA-ID 37 and also stores a random number code 38 in advance. Further, it is assumed that the random number code 38 is informed to a user 40 in advance. For example, the random number code 38 may be informed to the user 40 by means of a seal affixed to the housing of the verification device 30, the operating manual of the verification device 30, or the like.

When a picture 24 is displayed for the first time, the TA 23 generates a TA-ID at the time of generating a secret key 201 and a public key 202. Here, the TA 23 requests an authentication device 10 to issue a public key certificate in association with the TA-ID. Then, a display device 20 transmits the public key certificate associated with the TA-ID that is issued by the authentication device 10 to the verification device 30. Further, when the picture 24 is displayed for the second and subsequent times, the TA 23 transmits the TA-ID that has been generated to the verification device 30.

A certificate verification unit 32 stores identification information in a storage unit when information has not been stored in the storage unit and certifies that the TA 23 is valid when certification information is valid. Specifically, the certificate verification unit 32 stores a TA-ID transmitted from the display device 20 in the TA-ID 37 when the TA-ID 37 is null, that is, when the picture 24 is displayed for the first time.

On the other hand, when information has been stored in the prescribed storage unit of the verification device 30, the certificate verification unit 32 certifies that the TA 23 is valid when certification information is valid and when the information stored in the storage unit and identification information are identical. Specifically, the certificate verification unit 32 identifies a TA-ID transmitted from the display device 20 with a TA-ID stored in the TA-ID 37 when the TA-ID 37 is not null, that is, when the picture 24 is displayed for the second and subsequent times.

Further, the certificate verification unit 32 also verifies whether a TA-ID transmitted from the display device 20 and a TA-ID stored in the TA-ID 37 match each other at the time of verifying the validity of a public key certificate. Then, the certificate verification unit 32 verifies that the public key certificate is valid when the TA-IDs match each other.

Like the first embodiment, an authentication unit 33 authenticates the display device 20 when the validity of a code signing certificate is certified by a signature verification unit 31, the validity of a public key certificate is certified by the certificate verification unit 32, and a valid authentication response is returned by an authentication unit 26 of the display device 20.

An encryption unit 34 encrypts a prescribed code informed to the user 40 in advance with the public key 202 and transmits the encrypted prescribed code to the display device 20 when the display device 20 is authenticated by the authentication unit 26. Further, a decryption unit 27 decrypts a random number code encrypted by the encryption unit 34 with the secret key 201. Further, an output unit 25 of the display device 20 outputs the random number code decrypted by the decryption unit 27.

At this time, an output unit 36 of the verification device 30 informs the user 40 of the fact that the TA 23 of the display device 20 works normally. The output unit 36 can output second information using output means that is provided in the verification device 30 and capable of switching the on-off state of output. For example, the verification device 30 may provide information by lighting up a lamp or the like.

Further, the output of a random number code by the display device 20 may be performed only when at least the picture 24 is displayed for the first time. This is because, since validity is certified at the first time display, it is guaranteed that the TA 23 of the display device 20 works normally if the output of the output unit 36 is performed so long as the display device 20 that is being used remains the same.

For example, when information (for example, lighting up a lamp) indicating that the TA 23 of the display device 20 works normally is not provided by the verification device 30 at the first time display, it is presumed that the screen of the display device 20 that is being viewed by the user 40 is a disguised screen output from a REE 20a. Further, when a random number code displayed on the display device 20 does not match a random number code informed to the user 40 in advance, it is presumed that the screen of the display device 20 that is being viewed by the user 40 is a disguised screen output from the REE 20a or the display device 20 has been replaced.

[Processing of Second Embodiment]

Figure 6:
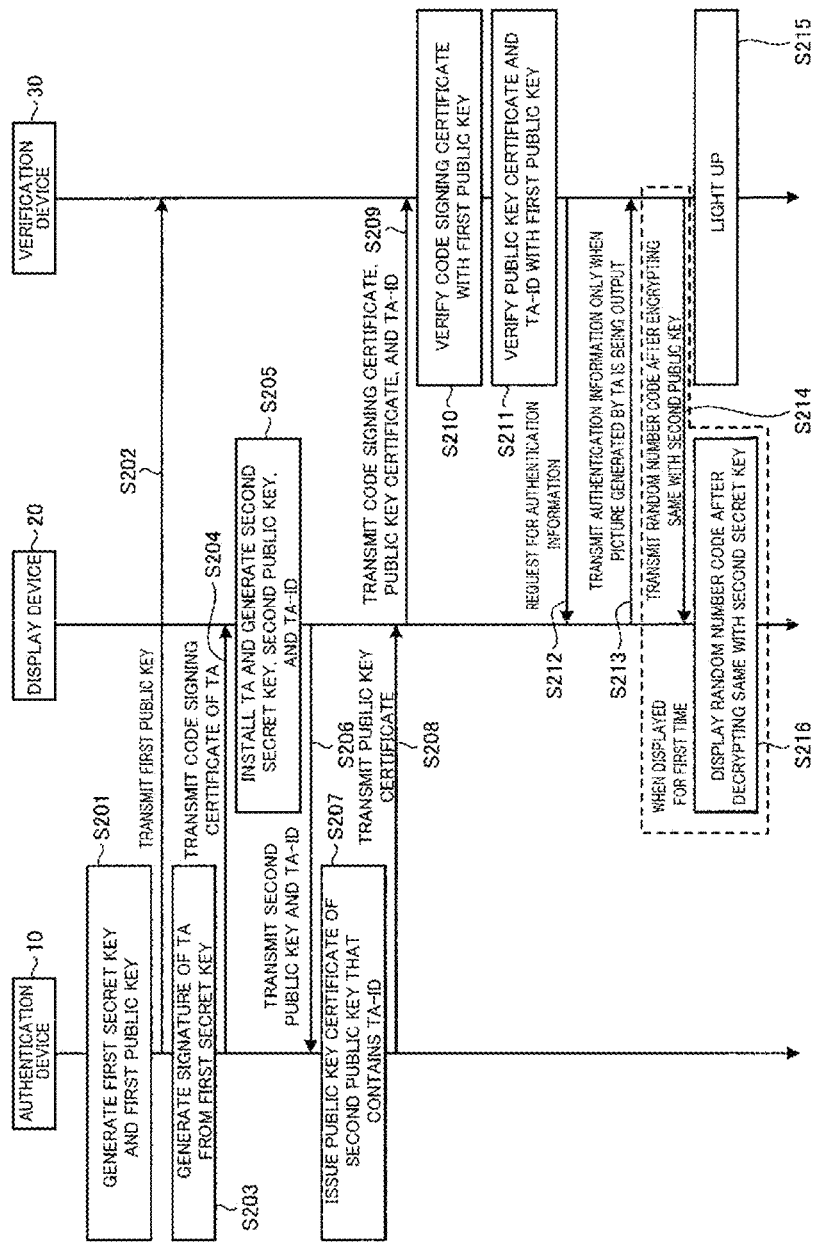
FIG. 6 is a sequence diagram showing the flow of the processing of the confirmation system according to the second embodiment.

The flow of the processing of a confirmation system 1 will be described using FIG. 6. FIG. 6 is a sequence diagram showing the flow of the processing of the confirmation system according to the second embodiment. As shown in FIG. 6, the authentication device 10 first generates a first secret key and a first public key (step S201).

Then, the authentication device 10 transmits the first public key to the verification device 30 (step S202). Further, the authentication device 10 generates the signature of a TA from the first public key (step S203). Then, the authentication device 10 transmits a code signing certificate generated from the signature to the display device 20 (step S204).

The display device 20 installs the TA and generates a second secret key, a second public key, and a TA-ID (step S205). Then, the display device 20 transmits the second public key and the TA-ID to the authentication device 10 and requests for the issuance of a public key certificate (step S206). Here, the authentication device 10 issues the public key certificate containing the TA-ID (step S207) and transmits the same to the display device 20 (step S208). Then, the display device 20 transmits the code signing certificate, the public key certificate, and the TA-ID to the verification device 30 (step S209).

The verification device 30 verifies the validity of the code signing certificate with the first public key (step S210). Further, the verification device 30 verifies the validity of the public key certificate and the TA-ID with the first public key (step S211). Then, the verification device 30 requests the display device 20 to transmit authentication information when the validity is certified in each of the verification (step S212). The display device 20 transmits the authentication information in response to the authentication request only when a picture generated by the TA is being output (step S213).

The following processing is performed when the picture 24 is displayed for the first time. The verification device 30 transmits a random number code set in advance to the display device 20 after encrypting the same with the second public key (step S214). Here, the verification device 30 lights up a lamp (step S215). Further, the display device 20 decrypts the random number code transmitted from the verification device 30 with the second secret key and displays the decrypted random number code (step S216).

[Effects of Second Embodiment]

The display device 20 outputs second information using output means that is provided in the verification device 30 and capable of switching the on-off state of output. Further, the display device 20 transmits a prescribed code informed to a user in advance as third information. In this manner, it is possible to provide a user with information by a simple method such as lighting up a lamp.

Further, the TA 23 of the display device 20 also generates identification information for identifying the TA 23. Further, the TA 23 transmits the identification information to the verification device 30 together with certification information. Further, when information has been stored in a prescribed storage unit, the verification device 30 certifies that the TA 23 is valid when the certification information is valid and when the information stored in the storage unit and the identification information are identical. Further, the verification device 30 stores the identification information in the storage unit when information has not been stored in the storage unit and certifies that the TA 23 is valid when the certification information is valid. Further, when the identification information is stored in the storage unit and the display device 20 is authenticated, the verification device 30 transmits third information to the display device 20. In this manner, the user 40 can verify the fact that a picture displayed on a screen 28 is the picture 24 that is reliable using the verification device 30 at the second and subsequent times display unless the display device 20 that is being used is changed by replacement or the like after verification at the first time display.

Third Embodiment

A third embodiment will be described. Note that points common to the first and second embodiments will be appropriately omitted in the description of the third embodiment. A TA-ID is issued by the display device 20 in the second embodiment, whereas a TA-ID is input by a user 40 in the third embodiment.

Figure 7:
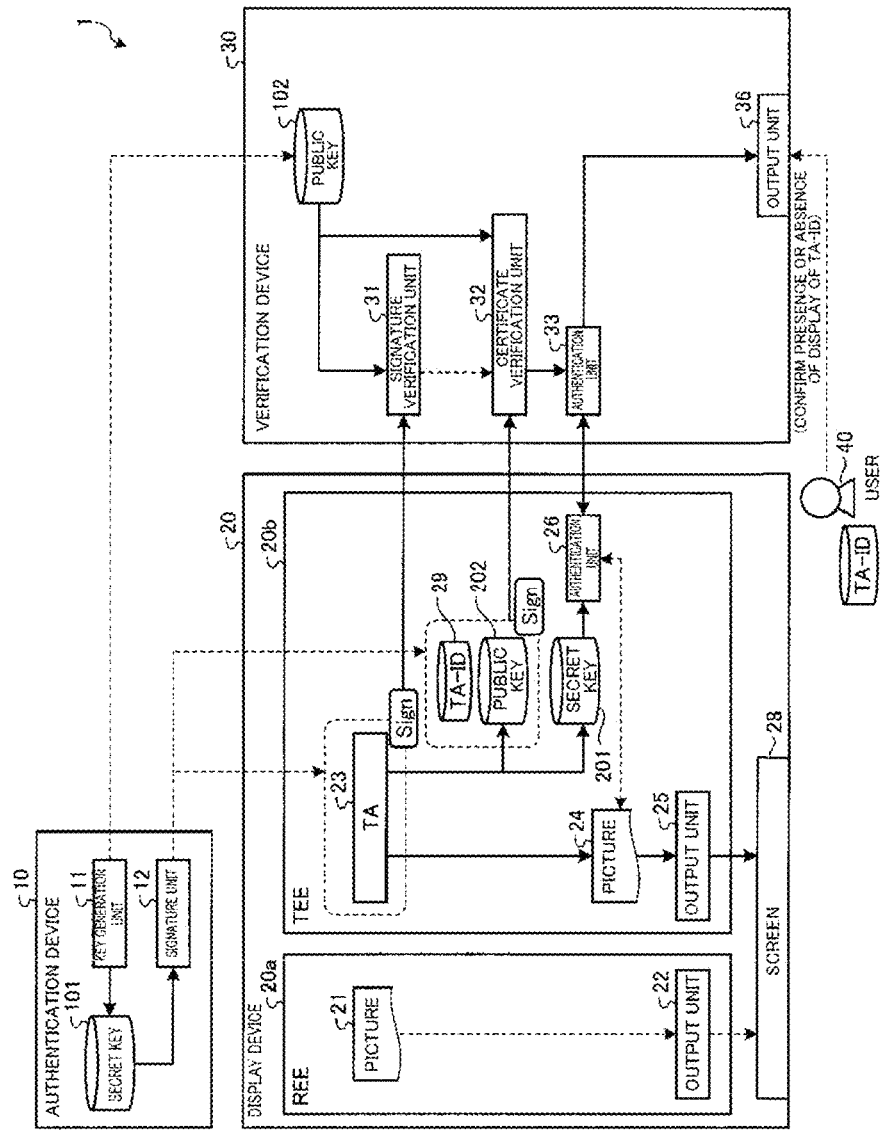
FIG. 7 is a diagram showing an example of the configuration of a confirmation system according to a third embodiment.

FIG. 7 is a diagram showing an example of the configuration of a confirmation system according to the third embodiment. In the third embodiment, a TA-ID input by the user 40 is stored in advance, a confirmation as to whether a TA-ID output by an output unit 36 matches the stored TA-ID is made as shown in FIG. 7.

A TA 23 transmits a TA-ID input by the user 40 to a verification device 30 together with a public key certificate. Note that the TA-ID is an example of prescribed identification information. Then, the output unit 36 outputs the TA-ID when the validity of a code signing certificate is certified by a signature verification unit 31 and when the validity of the public key certificate is certified by a certificate verification unit 32.

For example, when a TA-ID is not displayed by the verification device 30 or when a TA-ID displayed by the verification device 30 does not match a TA-ID stored in the user 40, it is presumed that the screen of the display device 20 that is being viewed by the user 40 is a disguised screen output from a REE 20a.

[Processing of Third Embodiment]

Figure 8:
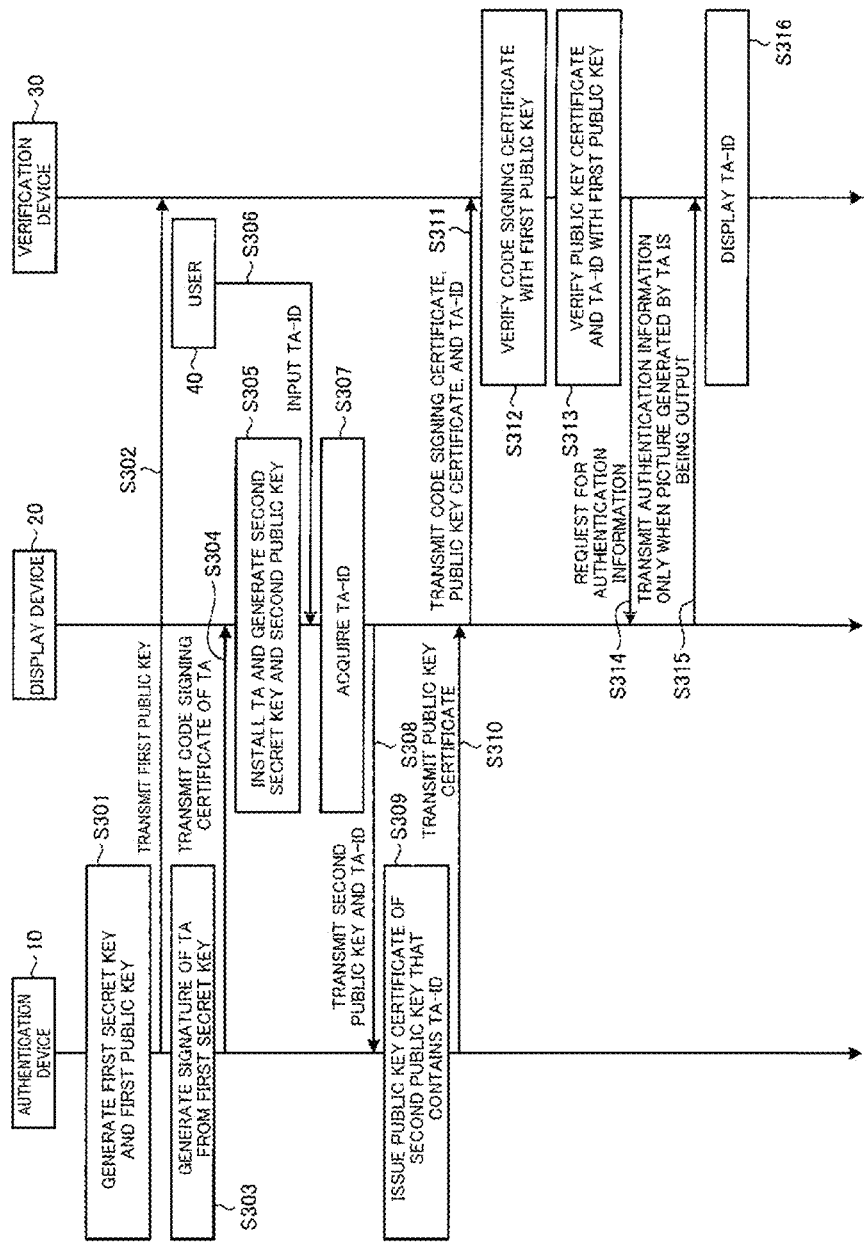
FIG. 8 is a sequence diagram showing the flow of the processing of the confirmation system according to the third embodiment.

The flow of the processing of a confirmation system 1 will be described using FIG. 8. FIG. 8 is a sequence diagram showing the flow of the processing of the confirmation system according to the third embodiment. As shown in FIG. 8, an authentication device 10 first generates a first secret key and a first public key (step S301).

Then, the authentication device 10 transmits the first public key to the verification device 30 (step S302). Further, the authentication device 10 generates the signature of a TA from the first public key (step S303). Then, the authentication device 10 transmits a code signing certificate generated from the signature to the display device 20 (step S304).

The display device 20 installs the TA and generates a second secret key and a second public key (step S305). Here, the display device 20 receives the input of a TA-ID from the user 40 (step S306) and acquires the input TA-ID (step S307). Note that a timing at which the display device 20 receives the input of the TA-ID may be an arbitrary timing before step S307.

Then, the display device 20 transmits the second public key and the TA-ID to the authentication device 10 to request for the issuance of a public key certificate (step S308). Here, the authentication device 10 issues the public key certificate containing the TA-ID (step S309) and transmits the issued public key certificate to the display device 20 (step S310). Then, the display device 20 transmits the code signing certificate, the public key certificate, and the TA-ID to the verification device 30 (step S311).

The verification device 30 verifies the validity of the code signing certificate with the first public key (step S312). Further, the verification device 30 verifies the validity of the public key certificate and the TA-ID with the first public key (step S313). Then, the verification device 30 requests the display device 20 to transmit authentication information when the validity is certified in each of the verification (step S314). The display device 20 transmits the authentication information in response to the authentication request only when a picture generated by the TA is being output (step S315). Then, the verification device 30 displays the TA-ID (step S316).

[Effects of Third Embodiment]

The TA 23 of the display device 20 operates on a TEE 20b and generates first information. Further, the TA 23 transmits identification information input by a user to the verification device 30 together with certification information for certifying the validity of the TA 23. Further, the display device 20 outputs first information generated by the TA 23. Further, the verification device 30 verifies whether the TA 23 is valid on the basis of the certification information. Further, the verification device 30 authenticates the display device 20 when the validity of the TA 23 is certified and when the verification device 30 is capable of confirming the facts that the first information is being output and that a device outputting the first information is the display device 20. Further, the verification device 30 outputs the identification information when the display device 20 is authenticated. In this manner, the user 40 can verify the fact that a picture displayed on a screen 28 is the picture 24 that is reliable using the verification device 30 unless the display device 20 that is being used is changed by replacement or the like.

Other Embodiments

In the above embodiments, it is described that the display device 20 and the verification device 30 output respective information through visual means such as a screen display and lighting. On the other hand, the display device 20 and the verification device 30 may output information through nonvisual means. For example, the display device 20 and the verification device 30 may output sound that reads out a random number code.

[System Configuration or the Like]

Further, the respective constituting elements of the respective devices shown in the figures are functionally conceptual and are not necessarily required to be physically configured as shown in the figures. That is, the specific modes of the dispersion and integration of the respective devices are not limited to those shown in the figures, but the whole or a part of the respective devices can be configured to be functionally or physically dispersed or integrated in an arbitrary unit according to various loads, use conditions, or the like. In addition, the whole or an arbitrary part of the respective processing functions performed by the respective devices can be realized by a CPU and a program analyzed and performed by the CPU, or can be realized as hardware based on a wired logic.

Further, among the respective processing described in the present embodiment, the whole or a part of the processing described as being automatically performed can be manually performed, or whole or a part of the processing described as being manually performed can be automatically performed by a known method. Besides, the processing procedures, the control procedures, the specific names, and the information containing various data or parameters shown in the above document or the drawings can be arbitrarily changed unless otherwise particularly noted.

[Program]

As an embodiment, the confirmation system 1 can be mounted by causing a computer to install a program according to an embodiment that performs the above processing as package software or online software. For example, an information processing device can function as the confirmation system 1 when caused to perform the program according to the embodiment. Here, the information processing device includes a desktop or notebook personal computer. Besides, the information processing device includes a smartphone, a mobile body communication terminal such as a mobile phone and a PHS (Personal Handyphone System), a slate terminal such as a PDA (Personal Digital assistant), or the like.

Figure 9:
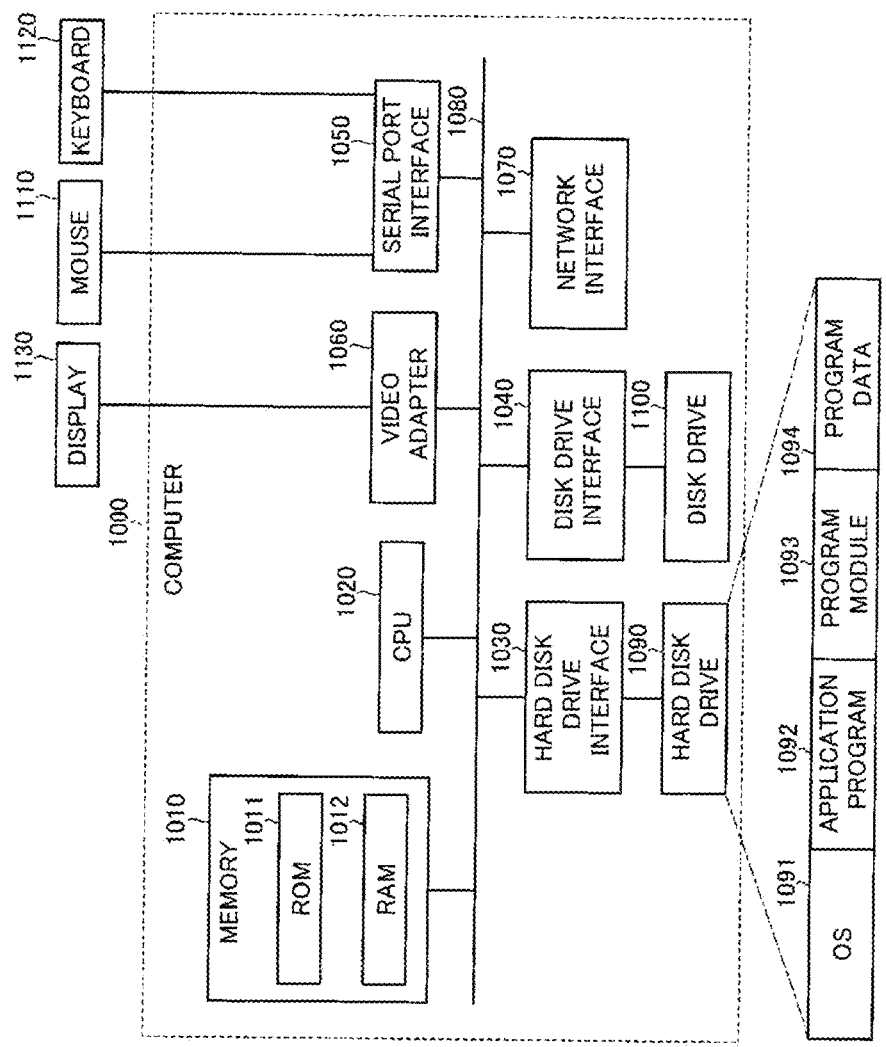
FIG. 9 is a diagram showing an example of a computer that performs a program according to an embodiment.

FIG. 9 is a diagram showing an example of a computer that performs the program according to the embodiment. A computer 1000 has, for example, a memory 1010 and a CPU 1020. Further, the computer 1000 has a hard disk drive interface 1030, a disk drive interface 1040, a serial port interface 1050, a video adapter 1060, and a network interface 1070. These respective units are connected to one another via a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to the hard disk drive 1090. The disk drive interface 1040 is connected to the disk drive 1100. For example, a detachable storage medium such as a magnetic disk and an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, a program that defines the respective processing of the display device 20 or the verification device 30 is mounted as the program module 1093 in which a code executable by a computer is described. The program module 1093 is stored in, for example, the hard disk drive 1090. For example, the program module 1093 for performing the same processing as that of a function configuration in the display device 20 or the verification device 30 is stored in the hard disk drive 1090. Note that the hard disk drive 1090 may be replaced by a SSD.

Further, setting data used in the above embodiments is stored in, for example, the memory 1010 or the hard disk drive 1090 as the program data 1094. Then, the CPU 1020 reads the program module 1093 or the program data 1094 stored in the memory 1010 or the hard disk drive 1090 into the RAM 1012 as required and performs the processing of the above embodiments.

Note that the program module 1093 or the program data 1094 is not necessarily stored in the hard disk drive 1090 but may be stored in, for example, a detachable storage medium and read by the CPU 1020 via the disk drive 1100 or the like. Alternatively, the program module 1093 and the program data 1094 may be stored in other computers connected via a network (such as a LAN (Local Area Network) and a WAN (Wide Area Network)). Then, the program module 1093 and the program data 1094 may be read by the CPU 1020 via the network interface 1070 from other computers.

REFERENCE SIGNS LIST

1 Confirmation system
10 Authentication device

11 Key generation unit
12 Signature unit
20 Display device
20a REE
20b TEE
21, 24 Picture
22, 25, 36 Output unit
23 TA
26, 33 Authentication unit
27 Decryption unit
28 Screen
31 Signature verification unit
32 Certificate verification unit
34 Encryption unit
35 Random number code issuance unit
37 TA-ID
38 Random number code
40 User
101, 201 Secret key
102, 202 Public key

The invention claimed is:

1. A confirmation system, comprising:
a display device including a first execution environment and a second execution environment which is higher in safety than the first execution environment; and
a verification device that verifies whether the display device works normally, wherein
the display device further includes first processing circuitry configured to
operate on the second execution environment to generate a picture,
transmit certification information for certifying validity of the display device to the verification device,
receive a first number code from the verification device, and
output the picture and the first number code, and
the verification device includes second processing circuitry configured to
verify the certification information to certify validity,
authenticate the display device in a case that the validity is certified and in a case that the second processing circuitry confirms that the picture is output or to be output by the display device,
transmit the first number code to the display device in a case that the display device is authenticated, and
output a second number code,
the second number code is identical to the first number code in a case that the display device is authenticated,
the second number code is not identical to the first number code in a case that the display device is not authenticated, and
the first number code is output by the display device at a same time as the second number code being output by the verification device for confirmation by a user viewing the output of the display device and the output of the verification device.

2. The confirmation system according to claim 1, wherein the first processing circuitry is further configured to
generate a pair of a secret key and a public key, and
transmit, to the verification device, a code signing certificate and a public key certificate of the public key as the certification information,
the second processing circuitry is further configured to
verify whether the code signing certificate and the public key certificate are valid, and
transmit the first number code after encrypting the first number code with the public key, and
the first processing circuitry is further configured to decrypt the encrypted first number code.

3. The confirmation system according to claim 1, wherein the second processing circuitry is further configured to
issue a random number code, and
transmit the random number code as the first number code.

4. The confirmation system according to claim 1, wherein the second processing circuitry is further configured to
output the second number code using a display provided in the verification device, and
transmit a prescribed code informed to a user in advance as the first number code.

5. The confirmation system according to claim 1, wherein the first processing circuitry is further configured to
generate identification information for identifying the display device, and
transmit the identification information with the certification information to the verification device, and
the second processing circuitry is further configured to
certify that the display device is valid in a case that the certification information is valid and information stored and the identification information are identical when the information is stored in a prescribed storage of the verification device,
store the identification information in the storage when the information is not stored in the storage and certify that the display device is valid in a case that the certification information is valid, and
transmit the first number code to the display device when the identification information is stored and the display device is authenticated.

6. A confirmation method performed by a confirmation system having a display device and a verification device, the display device including a first execution environment and a second execution environment that is guaranteed to be higher in safety than the first execution environment, and the verification device configured to verify whether the display device works normally, the confirmation method comprising:
operating on the second execution environment to generate a picture;
transmitting, by the display device to the verification device, certification information for certifying validity of the display device;
outputting, by the display device, the picture;
verifying, by the verification device, the certification information to certify validity;
authenticating the display device in a case that the validity is certified and in a case that the picture is output or to be output by the display device;
transmitting, by the verification device, a first number code to the display device in a case that the display device is authenticated;
receiving, by the display device, the first number code from the verification device;
outputting, by the display device, the first number code; and
outputting, by the verification device, a second number code, wherein
the second number code is identical to the first number code in a case that the display device is authenticated,
the second number code is not identical to the first number code in a case that the display device is not authenticated, and
the outputting the first number code by the display device is performed at a same time as the outputting the second number code by the verification device for confirmation by a user viewing output of the display device and output of the verification device.

7. A confirmation system, comprising:
a display device including a first execution environment and a second execution environment which is higher in safety than the first execution environment; and
a verification device that verifies whether the display device works normally, wherein
the display device further includes first processing circuitry configured to
operate on the second execution environment to generate a picture,
transmit certification information for certifying validity of the display device to the verification device,
receive a number code from the verification device, and
output the picture and the number code, and
the verification device includes second processing circuitry configured to
verify the certification information to certify validity,
authenticate the display device in a case that the validity is certified and in a case that the second processing circuitry confirms that the picture is output or to be output by the display device,
transmit a prescribed code, informed to a user in advance, as the number code to the display device in a case that the display device is authenticated, and
control a light source to light up in a case that the display device is authenticated, and
the number code is output by the display device at a same time as the light source is controlled by the verification device to light up for confirmation by a user viewing the output of the display device and output of the verification device.

8. A confirmation method performed by a confirmation system having a display device and a verification device, the display device including a first execution environment and a second execution environment that is guaranteed to be higher in safety than the first execution environment, and the verification device configured to verify whether the display device works normally, the confirmation method comprising:
operating on the second execution environment to generate a picture;
transmitting, by the display device to the verification device, certification information for certifying validity of the display device;
outputting, by the display device, the picture;
verifying, by the verification device, the certification information to certify validity;
authenticating the display device in a case that the validity is certified and in a case that the picture is output or to be output by the display device;
transmitting, by the verification device, a prescribed number code to the display device in a case that the display device is authenticated, the prescribed number code having been informed to a user in advance;
receiving, by the display device, the prescribed number code from the verification device;
outputting, by the display device, the prescribed number code; and
controlling, by the verification device, a light source to light up in a case that the display device is authenticated, wherein
the outputting the prescribed number code by the display device is performed at a same time as the controlling the light source to light up by the verification device for confirmation by a user viewing output of the display device and output of the verification device.

* * * * *